United States Patent Office 3,440,290
Patented Apr. 22, 1969

3,440,290
METHOD FOR PREPARING POLYHYDROXY AROMATIC COMPOUNDS RICH IN META ORIENTATION
Alexander H. Widiger, Jr., Midland, Mich., assignor to The Dow Chemical Company, Midland, Mich., a corporation of Delaware
No Drawing. Filed Aug. 5, 1965, Ser. No. 477,610
Int. Cl. C07c 37/00, 39/08, 43/22
U.S. Cl. 260—613        9 Claims The present invention relates to an improved method for preparing resorcinol, catechol, dihydroxy diphenyl ethers trihydroxydiphenyls and highers in commercially economical quantities employing milder reaction conditions, more economical reactants and easier to handle reactants.

There is much prior art in the field of hydrolyzing chlorobenzenes, dichlorobenzenes and chlorophenols. It is, however, believed that none of the prior workers recognized the significance of the strength of the caustic on the overall yield of valuable products.

The present process comprises reacting about one mole of a chlorophenol or a mixture of the isomers thereof with from 4 to 8 moles, and preferably 5 to 6 moles, of sodium hydroxide as a 20 to 50% aqueous solution under the autogenous pressure of the mixture at about 250° to 270° C., and preferably at about 265° C. for from about ½ to about 2 hours. The resulting products, rich in meta orientation, are principally dihydroxy benzenes and dihydroxy diphenyl ethers. The products can conveniently be separated from the reaction mixture by acidification thereof to a pH value of about 3 to about 6 and subsequent extraction with an organic extractant, such as sec. butyl alcohol, amyl alcohol, and the like, and recovered from the extractant and from each other by fractional distillation under vacuum.

The process of the present invention can be carried out to yield about 60% conversion, based on the chlorophenol consumed, at 65° C., within 30 minutes when using at least some ortho and/or para isomer in the starting chlorophenol. Longer reaction periods do not materially increase the yield of desired products, that is, the dihydroxy benzenes and the dihydroxy diphenyl ethers but longer periods are not materially detrimental to the meta orientation up to about 2 hours. It being clearly understood that at other temperatures and at pressures slightly greater than autogenous pressures the time will vary approximately inversely to the temperature.

In the following examples the products are defined as N-1, N-2, and N-3. These symbols represent the number of phenylene nuclei in the compounds. Thus, N-1 represents the dihydroxy benzenes, catechol, resorcinol and hydro quinone; N-2 represents the bis(hydroxyphenyl) ethers having the generic formula

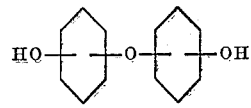

as well as the trihydroxy diphenyls having the generic formula

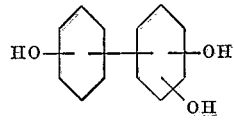

and N-3 represents the bis(hydroxyphenoxy)benzenes, e.g.,

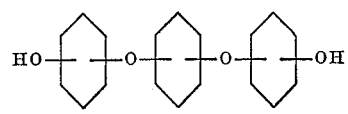

the hydroxy phenoxy dihydroxy diphenyls

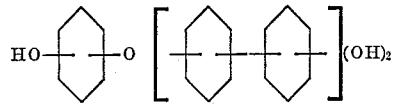

and some tetrahydroxy triphenyls (e.g.),

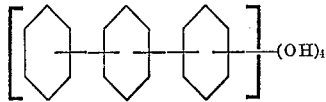

The following examples illustrate the process of the present invention but are not to be construed as limiting.

EXAMPLES

A series of experiments were run to establish the limits reactants of the present process. Each experiment consisted of the reaction at 265° C. of the indicated chlorophenol isomer with c.p. sodium hydroxide and distilled water. The reaction was carried out in an iron bomb placed in a rocker. The reaction time was 30 minutes for the ortho and meta isomers and 120 minutes for the para isomer. Upon completion of the reaction the reaction mixture was acidified with HCl to pH 4.5. The phenolic products were separated from the aqueous phase by 4 extractions with sec. butyl alcohol. The alcohol was removed from the extracted organic phase by distillation under vacuum and the products separated one from the other by fractional distillation in vacuo. The results of the series of runs are set out in the tables below.

| | NaOH | | Chlorophenol, g. | Product grams | | | | Percent | | Percent Dist. dihydroxy compounds in N-1 | | |
|---|---|---|---|---|---|---|---|---|---|---|---|---|
| | Grams | Strength, percent | | Cl$\phi$OH | N-1* | N-2* | N-3* | Conv. | Yield | O | M | P |
| | | | ORTHO | | | | | | | | | |
| 1 | 74.5 | 20 | ¹87.0 | 60 | 11 | 3.9 | ---------- | 31 | 64 | 28 | 72 | (²) |
| 2 | 107 | 30 | ¹125 | 61.5 | 31.5 | 10 | 2.8 | 52 | 81 | 28 | 72 | ---------- |
| 3 | 121 | 35 | ¹143 | 48 | 53 | 10 | 6.5 | 66 | 82 | 33 | 67 | ---------- |
| 4 | 148 | 40 | ¹174 | 49 | 53.4 | 22.9 | 2 | 72 | 83 | 36 | 64 | ---------- |
| 5 | 197 | 50 | 113 | 8 | 42 | 23 | 9.5 | 93 | 73 | 40 | 60 | ---------- |
| 6 | 256 | 65 | 150.5 | 13.5 | 50.8 | 21.3 | 18 | 91 | 79 | 50 | 50 | ---------- |
| | | | META | | | | | | | | | |
| 7 | 74.5 | 20 | ⁴130.5 | 69 | 27.5 | 13.0 | 53 | 47 | 88 | 15.5 | 81.8 | (²) |
| 8 | 88 | 25 | ⁴153.6 | 71 | 36 | 19.2 | 6.5 | 54 | 89 | 18.5 | 79 | ---------- |
| 9 | 107 | 30 | ¹125 | 28 | 33.2 | 24 | 17 | 77 | 92 | 25.6 | 71.5 | ---------- |
| 10 | 128 | 35 | ¹150 | 22.7 | 44.5 | 29.5 | 20 | 85 | 89 | 25.5 | 73 | ---------- |
| 11 | 148 | 40 | ¹168 | 21 | 49.2 | 25 | 38 | 88 | 92 | 25.2 | 73 | ---------- |
| 12 | 197 | 50 | 115 | 8 | 32 | 21 | 25 | 93 | 88 | 32.7 | 63.6 | ---------- |
| | | | PARA | | | | | | | | | |
| 13 | 74.5 | 20 | ⁴126 | 104.5 | 10 | 6.3 | ---------- | 17 | 79 | (³) | 67.5 | 30.5 |
| 14 | 26.5 | 30 | ¹125 | 79 | 17 | 9 | ---------- | 36 | 69 | ---------- | 50 | 49 |
| 15 | 128 | 35 | ¹91.2 | 84 | 20 | 10.2 | 9.0 | 48 | 68 | ---------- | 60 | 39 |
| 16 | 148 | 40 | ¹87.8 | 83.8 | 24.5 | 13.5 | 15.2 | 52 | 73 | ---------- | 58 | 42 |
| 17 | 197 | 50 | 115 | 34 | 20.5 | 14.8 | 12.8 | 70 | 72 | ---------- | 27 | 72.5 |

*These symbols have the significance aforesaid.
¹ Two replicates of this experiment were run and the data is that obtained by combining the two products recovered on removal of the sec. butyl alcohol.
² Balance if any para.
³ Balance if any ortho.
⁴ Three replicates.

I claim:

1. A method for preparing a polyhydroxy aromatic product which comprises reacting a mixture consisting essentially of a chlorophenol with from 4 to 8 moles of 20 to 50% aqueous solution of sodium hydroxide under the mixtures autogenous pressure at a temperature of from about 250° to 270° C. for between about ½ to 2 hours, and separating from the reaction mixture a product rich in meta oriented dihydroxybenzene, dihydroxy diphenyl ethers and trihydroxy diphenyl, and low in hydroxy phenoxy phenoxyphenols, and highers.

2. The method of claim 1 wherein the chlorophenol is meta chlorophenol.

3. The method of claim 1 wherein the chlorophenol is ortho chlorophenol.

4. The method of claim 1 wherein the chlorophenol is para chlorophenol.

5. The method of claim 2 wherein the reaction temperature of 265° C.

6. The method of claim 5 wherein the reaction period is about ½ hour.

7. The method of claim 4 wherein said reaction temperature is 265° C. and the reaction period is 120 minutes.

8. The method of claim 3 wherein said reaction temperature is 265° C. and the reaction time is ½ hour.

9. The method of claim 1 which consists essentially of reacting a chlorophenol with 5 to 6 moles of 20 to 50% aqueous solution of sodium hydroxide at about 265° C. for ½ to 2 hours.

References Cited

UNITED STATES PATENTS 2,041,592   5/1936   Burroughs ---------- 260—629

BERNARD HELFIN, *Primary Examiner.*

U.S. Cl. X.R.
260—620, 629

U.S. DEPARTMENT OF COMMERCE
PATENT OFFICE
Washington, D.C. 20231

UNITED STATES PATENT OFFICE
CERTIFICATE OF CORRECTION

Patent No. 3,440,290                          April 22, 1969

Alexander H. Widiger, Jr.

It is certified that error appears in the above identified patent and that said Letters Patent are hereby corrected as shown below:

Column 1, line 38, "65° C." should read -- 265° C. --. Columns 1 and 2, in the table, second column, line 14 thereof, "26.5" should read -- 62.5 --.

Signed and sealed this 14th day of April 1970.

(SEAL)
Attest:

Edward M. Fletcher, Jr.                    WILLIAM E. SCHUYLER, JR.
Attesting Officer                             Commissioner of Patents